United States Patent Office 2,774,891
Patented Dec. 18, 1956

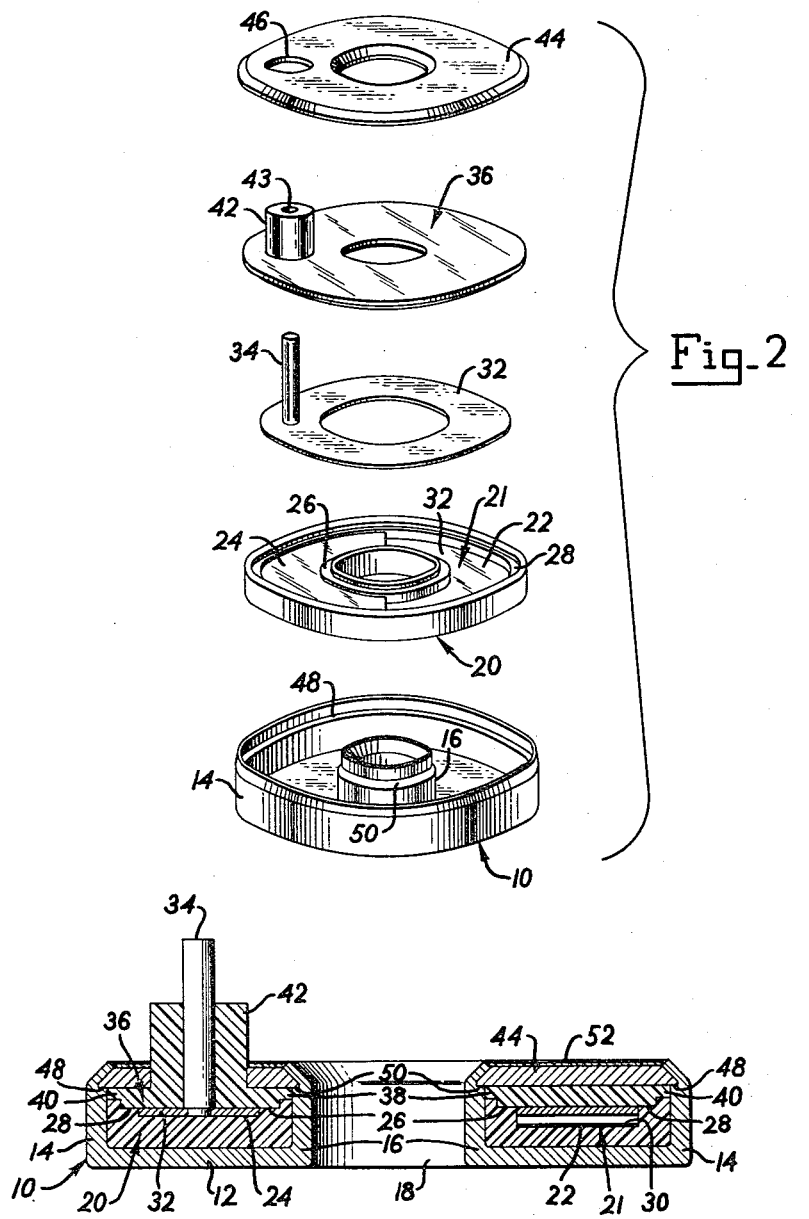

2,774,891

MEANS FOR COLLECTING AND UTILIZING ELECTRICAL ENERGY OF NUCLEAR TRANSFORMATIONS

Edward J. Dziedziula, Glendale, and Harry C. Lieb, Rockville Centre, N. Y., assignors to Universal Winding Company, Cranston, R. I., a corporation of Massachusetts Application November 23, 1954, Serial No. 470,565

12 Claims. (Cl. 310—3)

The present invention relates to the generation of electrical energy and more particularly relates to an apparatus for collecting and utilizing the electrical energy of nuclear transformations.

Radioactive materials emit alpha-particles or beta-particles, or both, in the course of their nuclear transformation. The alpha-particles are positively charged and the beta-particles are negatively charged and the energies of these particles may be several million electron volts. In the past devices have been made to utilize directly the electrical energy of these particles by placing a collector electrode or electrodes adjacent a supply of radioactive material to collect the charged particles and to thereby build up a potential between the radioactive material and said collector electrode. These devices have been unreliable and inefficient in performance, expensive, relatively large in size, easily broken, constitute a hazard to the health of personnel who make or use them, and are awkward to incorporate in circuits and mechanisms.

It is accordingly one object of the present invention to provide a compact and efficient device for utilizing directly the electrical energy from a nuclear transformation.

Another object of the present invention is to provide a device for utilizing directly the electrical energy of nuclear transformation wherein the electrons emitted from a radioactive material are collected in a highly efficient manner.

Another object of the present invention is to provide a device for utilizing directly the electrical energy of nuclear transformations that is dependable and which can be produced in large quantities at reasonable cost.

Another object of the present invention is to provide a device for utilizing directly the electrical energy from a nuclear transformation that is rugged and which will continue to function under extreme conditions of temperature and/or shock.

Another object of the present invention is to provide a device for utilizing directly the electrical energy from a nuclear transformation that can be safely manufactured and which will not endanger the health of personnel using it.

Another object of the present invention is to provide a device for utilizing directly the electrical energy from a nuclear transformation that is adapted to nest components of an electrical circuit.

Other objects of the invention will in part be obvious and will in part appear hereinafter.

The invention accordingly comprises the apparatus possessing the construction, combination of elements and the arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

Fig. 1 is a sectional view of a preferred embodiment of the present invention; and Fig. 2 is an exploded view in perspective of the present invention.

The device of the present invention for collecting the electrical energy emitted by a nuclear transformation will be referred to hereinafter as a radioactive battery. The present battery comprises a supply of radioactive material, which may be strontium 90, that is a beta emitter encased in a solid dielectric which in turn is enclosed in an electron collector. A conductor is provided leading to the radioactive material and it becomes the positive terminal of the battery, when a beta emitting radioactive material is used, and the electron collector case becomes the negative battery terminal. The present battery is preferably annular in shape having a central opening adapted to receive a switch, resistor, capacitor or other component largely within the confines of the battery and without disturbing or changing, to an appreciable degree, the battery's center of gravity.

Referring now to the drawing, one embodiment of the radioactive battery of the present invention comprises an annular case 10, which may be made of brass, having a bottom wall 12, a cylindrical outer wall 14 and a cylindrical inner wall 16 coaxial with said outer wall. The bottom wall 12 is provided with an opening 18 in alignment with the bore formed by inner wall 16. A ring of dielectric material 20, preferably polystyrene, is located in the channel formed by walls 14 and 16 and supported by bottom wall 12 and has a circular groove 21 formed in the upper surface thereof. One half of groove 21 is approximately twice as deep as the other half. Both of said halves are semi-circular and are complementary to each other. The deeper section of groove 21 has been designated 22 on the drawing and the shallow portion has been designated 24. The upper sides of groove 21 are rabbeted to provide a pair of upwardly facing shoulders 26 and 28 that are in the same plane.

A supply of radioactive material 30, which preferably includes strontium 90 in the form of strontium chloride is carried in the deep section 22 of groove 21. Radioactive material 30 is preferably in the form of a thin coating of substantially uniform thickness over the entire bottom surface of said deep section 22 and can be deposited therein by placing a solution containing the radioactive material in said section 22 and evaporating the solvent. An annular emitter electrode 32, which may be formed of copper, having upstanding pin 34 fixed thereto, to function as a terminal for the battery, is seated in shallow portion 24 of groove 21 and is positioned in the upper portion of the deep section 22 of said groove. Emitter electrode 32 is so oriented in groove 21 that terminal pin 34 is located at the midpoint of the shallow portion 24 of the groove. When terminal pin 34 is thus located it is as far removed from radioactive material 30 as is possible. A second dielectric ring 36, also preferatbly formed of polystyrene, is positioned between cylindrical walls 12 and 14 and overlies dielectric ring 20 and annular electrode 34. The two lower edges of dielectric ring 36 are rabbeted to provide flanges 38 and 40 which are bonded to the upper surface of ring 20 and to permit the lower surface of ring 36 to engage and be bonded to shoulders 26 and 28. An upstanding detent-like bushing 42 having an opening 43 extending therethrough is formed on the upper surface of dielectric ring 36, and upstanding terminal pin 34, carried by annular electrode 32, extends therethrough and is insulated thereby.

A cover plate 44, provided with an opening 46 to receive bushing 42, closes the channel formed by walls 16 and 18. Cover plate 44, which may be formed of brass, rests on shoulders 48 and 50 formed in walls 14 and 16 respectively and is held in position by the upper edges of said walls which are rolled over chamfers formed on the edges of said cover plate. The rolled edges of walls 14 and 16 not only secures case 10 and cover plate 44 together mechanically but also connects these two elements electrically so together they function as a collector electrode. In addition to the mechanical connection between case 10 and cover 44 the joints therebetween are sealed with a layer of thermo-setting plastic 52 that advantageously can be epoxy-resin.

The above described apparatus functions in the following manner. Electrons emitted by radioactive material 30 pass through dielectric material 20 and into collector case 10. Electrons also pass from radioactive material 30 through the electrode 32 and the dielectric material 36 and into cover plate 44. The passage of electrons into case 10 and cover plate 44 give these two elements, which are connected electrically, a negative charge. The loss of electrons leaves radioactive material 30 with a positive charge. When terminal pin 34 and case 10 are connected in a closed circuit, electrical energy will flow from said case to said pin even though emitter electrode 32 is not in contact with the positive charged radioactive material. Emitter electrode 32 is located adjacent radioactive material 30 and the gas or gases located between said electrode and said radioactive material, normally air but which may be any other suitable gas or combination of gases, is ionized by the electrons emitted from said radioactive material to lower its resistance and in effect electrically connect said electrode to said radioactive material. The thickness of the dielectric material at the bottom of the deep section 22 and the thickness of dielectric ring 36 is such that the electrons emitted from the radioactive material can pass therethrough and enter either case 10 or cover plate 44. However, the dielectric is thick enough to prevent backscattered secondary electrons from either said case or cover plate from passing back therethrough to the radioactive material. The thickness of case 10 and cover plate 44 is such that all electrons that pass through the dielectric material will be absorbed either by the case or cover plate thus preventing any of them from passing completely out of the radioactive battery.

Only one half of groove 21 is used to contain radioactive material. This is to prevent high energy particles, emitted by yttrium$^{90}$ the decay product of strontium$^{90}$, from passing upwardly through dielectric ring 36 and bushing 42 to ionize the atmosphere between terminal pin 34 and case 10. Obviously any ionization of the atmosphere around terminal pin 34 will permit all, or a large part, of the charge developed by the battery to leak off. By having the radioactive material located on the opposite side of the battery from terminal 34 no high energy charged particles can pass up through bushing 42, in fact none can reach the vicinity of pin 34 inasmuch as to do so they would have to pass through the lateral thickness of the dielectric material and sufficient thickness is present in that direction to prevent such passage.

The above described radioactive battery incorporates a separate annular emitter electrode positioned between the two dielectric elements 20 and 36. An alternate construction substitutes a layer or coating of conducting paint or ink, as for example, silver paint, on the under surface of dielectric ring 36. When such a construction is employed, terminal pin 34 is embedded in bushing 42 with its lowermost end flush with the lower surface of said dielectric ring to make electric contact with the conducting paint or ink.

The above described radioactive battery can conveniently be manufactured in the following manner. Dielectric element 20 is assembled in collector case 10 and a strontium chloride in acid solution is introduced into the deep section 22 of the groove formed in dielectric ring 20. The unit thus far assembled is subjected to a drying operation to evaporate the solvent from the strontium chloride solution to thereby leave a thin deposit of the radioactive material on the bottom wall of said deep section 22. Emitter electrode 32 is placed in groove 20 with terminal pin 34 located over the mid-point of the shallow portion 24 of said groove. Dielectric ring 34 is next positioned in case 10 and groove 21 by fitting opening 43 in bushing 42 over upstanding terminal pin 34. Following this cover plate 44 is placed in position. The entire unit is then heated to a temperature above the fusion temperature of dielectric elements 20 and 36 and pressure is applied to cover plate 44 to press said dielectric elements together and to cause them to fuse together at their mating surfaces. The pressure applied to cover plate 44 also presses bushing 42 into intimate engagement with terminal pin 34 and brings the edges of said cover plate into engagement with shoulders 48 and 50. The upper edges of case 10 are then rolled over the edges of said cover plate to firmly lock the unit together. A small quantity of thermo-setting plastic is deposited in the shallow channel formed by the inturned edges of case 10 and the unit is subjected to enough heat to cause the plastic to polymerize and to thereby provide an additional seal to the unit.

A specific example of a device including the feature set forth above was constructed with the components thereof having the following proportions:

Outside diameter of case—.900 inch
Diameter of bore through case—.250 inch
Height of case—.140 inch
Dielectric thickness between radioactive material and case—.020 inch
Dielectric thickness between radioactive material and cover plate—.020 inch
Wall thickness of case—.040 inch
Thickness of cover plate—.040 inch
Thickness of emitter electrode—.010 inch
Height of bushing 42—.125 inch
Sr$^{90}$Cl$_2$ radioactive material—1 millicurie The battery thus constructed uses the kinetic energy of the beta particles emitted from the radioactive material to build up to an equilibrium voltage of approximately 5,000 volts at $4 \times 10^{-12}$ amperes. The current will increase in a linear fashion as the quantity of radioactive material is increased up to about 4 millicuries. The rate of current production will fall off somewhat after 4 millicuries of radioactive material is exceeded due to secondary radiation and self absorption. The equilibrium voltage of the battery can be increased by increasing the length of dielectric bushing 42 to increase the distance between the uninsulated end of terminal pin 34 and case 10 and thereby decreasing the leakage that takes place between said terminal and case.

The battery of the present invention is highly efficient in operation inasmuch as the radioactive material is spread in a thin layer over a large area. Because of this there is less activity per unit area so that the conductivity of the dielectric is not unduly increased by reason of high energy radiation. Furthermore, there is a very small degree of self absorption beta particles by the radioactive material itself.

Since certain changes may be made in the above process and apparatus without departing from the scope of the invention herein involved, it is intended that all matter contained in the above description or shown in the accompanying drawing shall be interpreted as illustrative and not in a limiting sense.

What is claimed is:

1. A radioactive battery comprising an annular case, an annular dielectric element located in said case and having a groove formed therein, a supply of radioactive material in said groove, an emitter electrode in said groove, a second dielectric element covering said groove and electrode and bonded to said first mentioned dielectric element to thereby seal said radioactive material and electrode therebetween, and a cover closing said case, said case and cover forming a collector electrode to absorb charged particles emitted by said radioactive material.

2. A radioactive battery as set forth in claim 1 wherein said emitter electrode is spaced from said radioactive material, and having a gas in the space between said emitter electrode and radioactive material, said gas being ionized by radiation from said radioactive material to lower the electrical resistance thereof.

3. A radioactive battery as set forth in claim 1 wherein said groove is annular and said radioactive material occupies only part thereof.

4. A radioactive battery as set forth in claim 2 wherein said groove is annular and said radioactive material occupies only part thereof.

5. A radioactive battery comprising an annular case, an annular dielectric element located in said case and having an annular groove formed therein, a supply of radioactive material in a part only of said groove, an emitter electrode in said groove, a second dielectric element covering said groove and electrode and bonded to said first mentioned dielectric element to thereby seal said radioactive material and electrode therebetween, a cover closing said case, said case and cover forming a collector electrode to absorb charged particles emitted by said radioactive material, and a terminal connected to said emitter electrode in that part of the groove that is free of radioactive material and extending outside said collector electrode.

6. A radioactive battery as set forth in claim 5 wherein said emitter electrode is spaced from said radioactive material, and having a gas in the space between said electrode and radioactive material, said gas being ionized by radiation from said radioactive material to lower the electrical resistance thereof.

7. A radioactive battery comprising an annular case, an annular dielectric element located in said case and having a groove formed therein, a supply of radioactive material in said groove, a second dielectric element covering said groove and bonded to said first mentioned dielectric element to thereby seal said radioactive material therebetween, a conductive emitter electrode between said dielectric elements, and a cover closing said case, said case and cover forming a collector electrode to absorb charged particles emitted by said radioactive material.

8. A radioactive battery as set forth in claim 7 wherein said emitter electrode is spaced from said radioactive material, and having a gas in the space between said emitter electrode and radioactive material, said gas being ionized by radiation from said radioactive material to lower the electrical resistance thereof.

9. A radioactive battery comprising an annular case, an annular dielectric element located in said case and having an annular groove formed therein, a supply of radioactive material in a part only of said groove, a second dielectric element covering said groove and bonded to said first mentioned dielectric element to thereby seal said radioactive material therebetween, a conductive emitter electrode between said dielectric elements and spaced from said radioactive material, a gas in the space between said emitter electrode and radioactive material, said gas being ionized by radiation from said radioactive material to lower the electrical resistance thereof, a cover closing said case, said case and cover forming a collector electrode to absorb charged particles emitted by said radioactive material, and a terminal connected to said emitter electrode in that part of the groove that is free of radioactive material and extending outside said collector electrode.

10. A radioactive battery as set forth in claim 7 wherein said emitter electrode is a conductive coating carried by one of said dielectric elements.

11. A radioactive battery as set forth in claim 8 wherein said emitter electrode is a conductive coating carried by one of said dielectric elements.

12. A radioactive battery as set forth in claim 9 wherein said emitter electrode is a conductive coating carried by one of said dielectric elements.

No references cited.